(12) United States Patent
Boisvert et al.

(10) Patent No.: US 11,140,420 B2
(45) Date of Patent: Oct. 5, 2021

(54) METHODS AND SYSTEMS FOR BALANCING COMPRESSION RATIO WITH PROCESSING LATENCY

(71) Applicant: PLEORA TECHNOLOGIES INC., Kanata (CA)

(72) Inventors: Eric Boisvert, Quebec (CA); Mojtaba Hosseini, Ottawa (CA)

(73) Assignee: PLEORA TECHNOLOGIES INC., Kanata (CA)

( * ) Notice: Subject to any disclaimer, the term of this patent is extended or adjusted under 35 U.S.C. 154(b) by 0 days.

(21) Appl. No.: 16/334,487

(22) PCT Filed: Sep. 8, 2017

(86) PCT No.: PCT/CA2017/051065
§ 371 (c)(1),
(2) Date: Mar. 19, 2019

(87) PCT Pub. No.: WO2018/049513
PCT Pub. Date: Mar. 22, 2018

(65) Prior Publication Data
US 2019/0215536 A1    Jul. 11, 2019

(30) Foreign Application Priority Data
Sep. 19, 2016  (CA) .................................... 2,942257

(51) Int. Cl.
*H04N 19/91* (2014.01)
*H04N 19/436* (2014.01)
(Continued)

(52) U.S. Cl.
CPC ............. *H04N 19/91* (2014.11); *H04N 7/122* (2013.01); *H04N 19/117* (2014.11);
(Continued)

(58) Field of Classification Search
CPC ...... H04N 7/122; H04N 19/117; H04N 19/17; H04N 19/174; H04N 19/186; H04N 19/436; H04N 19/91; H04N 19/11; H04N 19/182
See application file for complete search history.

(56) References Cited

U.S. PATENT DOCUMENTS

2006/0159167 A1 *  7/2006  Shyang ................. H04N 19/61
                                                  375/240.03
2008/0025298 A1    1/2008  Lev-Ran et al.
(Continued)

FOREIGN PATENT DOCUMENTS

| EP | 2239945 A1 | 10/2010 |
|---|---|---|
| EP | 2472869 A2 | 7/2012 |
| WO | 2012040565 A1 | 3/2012 |

OTHER PUBLICATIONS

International Search Report corresponding to International applciation No. PCT/CA2017/051065 dated Dec. 18, 2017.
(Continued)

*Primary Examiner* — Neil R Mikeska
(74) *Attorney, Agent, or Firm* — Jenkins, Wilson, Taylor & Hunt, P.A.

(57) ABSTRACT

Described are various embodiments of systems, methods and devices for transmitting, over a digital network, a digital image data object defined by a plurality of image pixels, wherein embodiments comprise: a digital image compressor operable to compress the digital image data object by independently compressing distinct pixel groups defined amongst the plurality of image pixels into independently compressed pixel groups to be transmitted over the digital network, in which, for each of said compressed pixel groups, a comparison value indicative of a similarity between given pixel data of a given group pixel and reference pixel data of a corresponding reference pixel is computed to at least
(Continued)

partially replace said given pixel data; and a digital image decompressor coupled thereto operable to receive each of said independently compressed pixel groups for independent decompression.

21 Claims, 5 Drawing Sheets

(51) Int. Cl.
*H04N 19/186* (2014.01)
*H04N 19/17* (2014.01)
*H04N 19/117* (2014.01)
*H04N 19/174* (2014.01)
*H04N 7/12* (2006.01)
*H04N 19/182* (2014.01)
*H04N 19/11* (2014.01)

(52) U.S. Cl.
CPC ........... *H04N 19/17* (2014.11); *H04N 19/174* (2014.11); *H04N 19/186* (2014.11); *H04N 19/436* (2014.11); *H04N 19/11* (2014.11); *H04N 19/182* (2014.11)

(56) References Cited

U.S. PATENT DOCUMENTS

| | | | | |
|---|---|---|---|---|
| 2009/0033766 A1* | 2/2009 | Ito | ........................ | H04N 5/772 348/231.2 |
| 2010/0067813 A1 | 3/2010 | Sundstrom | | |
| 2012/0140779 A1* | 6/2012 | Janneteau | ............ | H04N 21/435 370/475 |
| 2012/0195511 A1 | 8/2012 | Park et al. | | |
| 2013/0010864 A1* | 1/2013 | Teng | .................... | H04N 19/152 375/240.12 |
| 2014/0119459 A1* | 5/2014 | Kumar | .................. | H04N 19/89 375/240.27 |
| 2014/0185676 A1 | 7/2014 | Chen et al. | | |
| 2015/0382007 A1 | 12/2015 | Bose | | |
| 2016/0119570 A1* | 4/2016 | Wong | ..................... | H04N 5/357 348/308 |
| 2016/0350056 A1* | 12/2016 | Makar | .................. | G06F 3/1454 |

OTHER PUBLICATIONS

International Preliminary Report on Patentability corresponding to International application No. PCT/CA2017/051065 dated Mar. 19, 2019.

Written Opinion of the International Searching Authority corresponding to International application No. PCT/CA2017/051065 dated Dec. 18, 2017.

Yng et al. "A Low Complexity and Lossless Frame Memory Compression for Display Devices," IEEE Transactions on Consumer Electronics, IEEE Service Center, New York, vol. 54, No. 3, Aug. 1, 2008 (Aug. 1, 2008) pp. 1453-1458.

Extended European Search Report corresponding to European Application No. 17849954.7 dated May 13, 2020.

* cited by examiner

METHODS AND SYSTEMS FOR BALANCING COMPRESSION RATIO WITH PROCESSING LATENCY

FIELD OF THE DISCLOSURE

The present disclosure relates to compression and decompression techniques, and in particular, to methods and systems for balancing compression ratio with processing latency.

BACKGROUND

Many modern compression techniques are concerned with maximizing compression ratios in order to permit the transmission of large media files over communications infrastructure with limited bandwidth. Moreover, most media transmissions were either not time sensitive (i.e. static files for later use) or could use techniques such as buffering to accommodate either slower transmission or increased latency in decompressing and/or processing the transmitted data.

In general, compression techniques for transmitting images and video have been historically focused on achieving as much compression as possible (or, in other words, a high compression ratio, where compression ratio can be understood as a ratio of the size of a data set before compression and its size after compression). In some systems, latency resulting from compression and decompression has also become a limiting factor in some high-speed video or other real-time data analysis applications.

This historical observation may be a result of a number of reasons. Some of these reasons may include that limitations generally resulting from the use of image and video files, which tend to be very large, have generally been a result of restricted and expensive transmission bandwidth, thereby encouraging more and more compression, without regard to other causes of increased latency or potentially inconsistently available throughput (since they did not generally approach the limiting effects of restricted bandwidth).

Other non-limiting reasons include that image and video files can tolerate a certain threshold level of both loss and delay in compression/decompression due to an inability of a human to visually recognize such loss and/or delay. Provided they remain within certain threshold values, none of a dropped frame, an increase in the interval between frames, and minor losses in image quality will be detected by a human visually inspecting such frames. As an example, most humans can detect up to 45 frames per second; or put another way, unless frame rates are significantly lower than 20 ms/frame, there will be no visual detection of a change in image quality. As such, compression processes can use that amount of time to "wait" for larger and larger amounts of data for compression with negligible impact on visual quality of video.

In general, compression techniques for images and video operate by replacing similar or identical units of image data (e.g. a pixel or pixel characteristics, such as grayscale) with representative data. Accordingly, the larger the set of data that can be used for a given compression analysis, the more compression that can be achieved. In the case of an image, the more pixels that can be assessed in a given image or images (since adjacent images in a video stream, for example, can have redundant or near redundant data) the better the compression can be. The cost for using large blocks of data, however, is two-fold: (1) compression as well as decompression has to wait until an entire block (typically made up of several lines of the image) is received prior to beginning compression or decompression, as the case may be; and (2) the processing and memory resources required for both compression and decompression increase.

Current image and video technologies are progressing in a variety of ways. First, the degree to which communication has become the limiting factor is decreasing, so a focus on compression ratio, after a certain threshold, becomes less effective in solving the overall problem. Second, as a corollary to the first point, endpoints on the communication are becoming increasingly mobile and pressured to perform significant and/or complex image and video handling and, as such, the nature of the endpoint hardware may contribute to latency issues due to a reduced processing and memory capability (in a way that, for example, a rack of servers would not experience as compared to a handheld mobile device). Third, real-time computer-based analysis of images, videos, and other sensor data is becoming far more common and, as such, lossiness and delays that can be tolerated visually or otherwise are associated with significantly less tolerance for machine-based analysis. As an example, real-time processing may require image processing on the order of μs—and not ms. It becomes impractical to process large decompression blocks (for both compression and decompression). Fourth, real-time machine based analysis may require significant processing and memory resources, so reducing decompression complexity computationally is preferable.

Conventional video compression software packages do not provide sufficient ability to optimize compression ratio with other factors relating to overall latency of processing, including for mathematically lossless compression techniques and communicating compressed data. For example, JPEG2000/JPEG-LS, H.264, JPEG, VP8, and MPEG-4, as well as other image compression standards, implement very favourable compression ratios, but with less regard to the impact on loss, latency or decompression processing requirements. Without modification, the decompression process of many of these packages result in an inability to conduct any post-decompression analysis at required speeds for real-time image-based sensory and response systems at very high data-rates. Moreover, they are associated with a level of data loss resulting from compression that is incompatible with machine-based analysis.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for methods, systems, and devices for balancing compression ratio with processing latency that overcome some of the drawbacks of known techniques, or at least, provides useful alternatives thereto. Some aspects of this disclosure provide examples of such compression balancing alternatives.

In accordance with one aspect, there is provided a system for transmitting, over a digital network, a digital image data object defined by a plurality of image pixels, the system comprising: a digital image compressor operable to compress the digital image data object by independently compressing distinct pixel groups defined amongst the plurality of image pixels into independently compressed pixel groups to be transmitted over the digital network, in which, for each of said compressed pixel groups, a comparison value indicative of a similarity between given pixel data of a given group pixel and reference pixel data of a corresponding reference pixel is computed to at least partially replace said given pixel data; and a digital image decompressor communicatively coupled to said digital image compressor via the digital network and operable to receive each of said independently compressed pixel groups for independent decompression, in which, for each of said compressed pixel groups, replaced pixel data is automatically recovered using said comparison value and said reference pixel data.

In accordance with another aspect, there is provided a computerized method for low-latency distributed image processing of a digital image data object defined by a plurality of image pixels, the method comprising: receiving the digital image data object as input to a digital image compressor; compressing the digital image data object by independently compressing distinct pixel groups defined amongst the plurality of image pixels into independently compressed pixel groups by, for each of said compressed pixel groups: computing a comparison value indicative of a similarity between given pixel data of a given group pixel and reference pixel data of a corresponding reference pixel; at least partially replacing said given pixel data with said comparison value; transmitting each of said compressed pixel groups over a digital network to a digital image decompressor; and independently decompressing at said decompressor each of said compressed pixel groups by, for each of said compressed pixel groups, recovering replaced pixel data using said comparison value and said reference pixel data.

In accordance with another aspect, there is provided a digital image processing device for compressing and transmitting digital image data objects defined by a plurality of image pixels, the device comprising: a hardware processor; a communication interface to a digital communication network; and a digital storage device having stored thereon statements and instructions for execution by said processor. Said statements and instructions causing the processor to: compress each given digital image data object by independently compressing at least some distinct pixel groups defined therefor amongst its plurality of image pixels into independently compressed pixel groups, in which, for each of said compressed pixel groups, a comparison value indicative of a similarity between given pixel data of a given group pixel and reference pixel data of a corresponding reference pixel is computed to at least partially replace said given pixel data; and transmit said independently compressed pixel groups via said communication interface.

In accordance with another aspect, there is provided a digital image processing device for receiving and decompressing digital image data objects defined by a plurality of image pixels, the device comprising: a hardware processor; a communication interface to a digital communication network; and a digital storage device having stored thereon statements and instructions for execution by said processor. Execution of said statements and instructions by said processor to: receive independently compressed pixel groups defined from amongst distinct pixel groups of the image pixels via said communication interface; independently decompress the independently compressed pixel groups, in which, for each of said compressed pixel groups, compressed pixel data is automatically recovered using a comparison value corresponding to the compressed pixel data of a given group pixel and a reference pixel data from a corresponding reference pixel, wherein said comparison value is indicative of a similarity between said compressed pixel data and said reference pixel data.

The use of high speed image and video data transmission and processing is becoming more ubiquitous; in concert, data processing requirements are increasingly required to occur in mobile and/or distributed contexts. Real-time and machine-based analysis requires high-speed processing, with very low latency, and low tolerance for data loss. Current methods of compression, focused on maximizing compression ratio have failed to meet necessary requirements. There is a requirement for mathematically (in contrast to visually) lossless compression/decompression, with very low latency, and computational efficiency.

In a typical application for image/video data utilization, there is a requirement for a high volume data rate (e.g. >10-15 GB/s), wherein compression, transmission, decompression, and data processing must be performed, all with no loss in data integrity and at a much higher rate than was acceptable under visual image analysis (such rates may possibly be an order of magnitude faster, if not more; ms of latency were previously acceptable under visual analysis, but for real-time machine-based analysis, tolerance may be measured in $\mu s$).

In embodiments, the instantly disclosed subject matter relates to compression and decompression techniques for high-speed lossless video and/or image transmission and analysis/processing. The techniques supported herein may involve the use of interdependent line-by-line pairwise pixel-based processing, and avoiding format-dependent block-based analysis. In some embodiments, compression ratio can be increased or decreased depending on latency/throughput requirements. Some embodiments use line-based compression units, but such compression units can be adjusted, in some cases, in response to latency requirements dynamically. Transmitted images can be analyzed by receiving computing devices with optimal compression to ensure that overall latency from image capture to analysis is not impacted by compression/decompression beyond what may be necessary to account for prevailing network conditions.

Since existing compression techniques often have large blocks, and often inter-block or even inter-image dependency, image processing is slowed down by the compression and decompression as entire adjacent blocks must often be received prior to beginning data decompression and/or data processing. Often because of such inter-block dependence compression and decompression resources must be engaged serially, even though modern computing systems may comprise multiple cores, multiple processors or both, multi-queue or multi-component memory devices, and multi-queue or multi-component communications interfaces.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
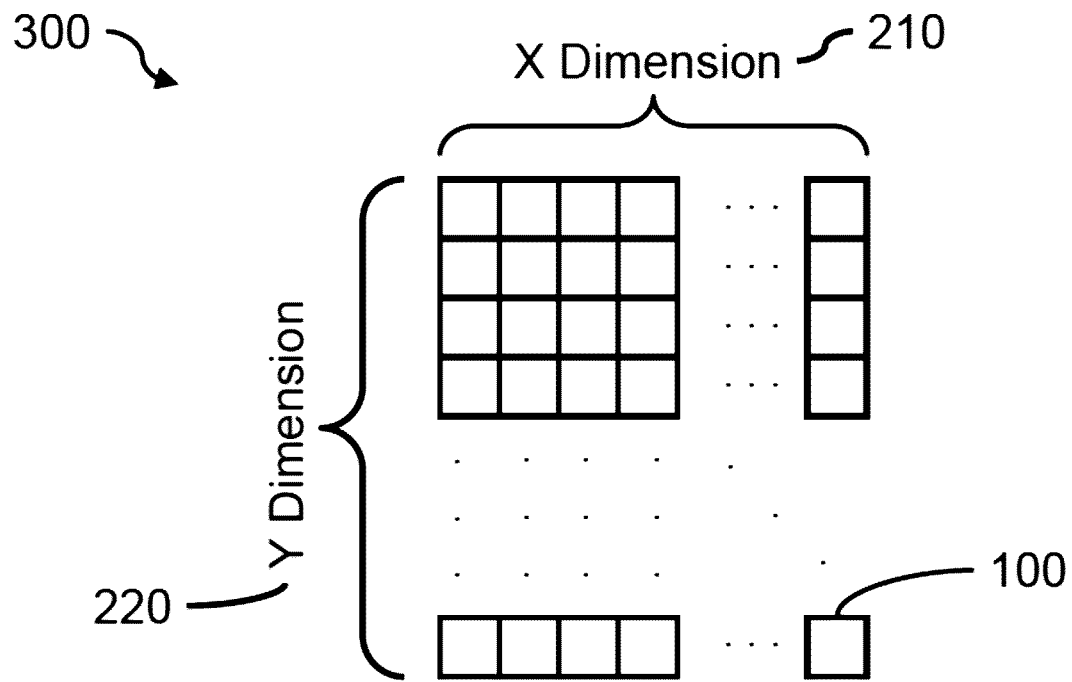
FIG. 1 is a conceptual representation of a two-dimensional compression object that can be used in accordance with one embodiment of the instantly disclosed subject matter.

The systems and methods described herein provide, in accordance with different embodiments, different examples in which systems, methods, and devices provide optimal and in some cases tunable compression associated with the communication and analysis of large data files that require low overall latency.

In embodiments of the instantly disclosed subject matter, aspects utilize discrete or independent groups of image pixels to look for redundancy, often image lines, as opposed to utilizing large blocks of pixels. By using image lines, or sub-line groups of pixels, embodiments can facilitate format-agnostic operation; some embodiments do not require preloaded information about image size, but can based pixel group size based on line size. Some existing systems using a block-sized compression group is generally not format-independent since every block must have similar sizes and/or dimensions. Some embodiments, do not use a line or segment based encoding, but rather an approach for encoding that assesses and/or compresses each pixel "dimension" separately; in other words, compression is performed on each dimension separately (and in some cases, which and how many dimensions are compressed may be selectively determined based on latency requirements). A "dimension" in this case refers to the one or more aspects of data that make up the pixel data for a given pixel; for example, greyscale value may consist of a single dimension that is considered for compression—that is, a greyscale value—and RGB consists of three dimensions that may be considered for compression—that is an "R" value, a "G" value, and a "B" value. In the prior examples, there may be additional dimensions that provide non-visual or chromatic data about a pixel, such as location, but in some systems, each of a given number of dimensions can be compressed independently of other dimensions. In some embodiments, the within-line compression analysis may utilize pair-wise analysis for pairs of pixels in a given line; in one embodiment, run-length compression processing is used in association with said pair-wise analysis. In some embodiments, there is no dependence between line-based compression pixel groups, either within a given image/frame or between adjacent images/frames, nor is there computational dependency between pixel groups or between subsequent and preceding pixel groups.

In general, the higher the degree of compression, the more processing time is required to compress and then decompress (the term "degree of compression" in the prior sentence is intended to include compression ratio, but also more generally to the level or amount of compression activity or processing that is required to compress uncompressed data). While a higher compression ratio typically means that a large amount of data can be reduced to a much small amount of data for transmission and/or other processing, it may also require additional processing time and/or resources to both compress (in order to look for and find redundancies for example) and decompress prior to and after transmission, and certainly prior to data analysis. In some cases, where there is excess bandwidth, for example, the benefit of increased compression may not be required; in cases where the goal is to decrease latency (resulting from any or all of compression, decompression, image analysis, or other image processing), then maximum compression at all costs can sometimes provide diminishing returns, particularly when there is excess compression that, for example, reduce a data objet well below available bandwidth limits. Embodiments hereof may simplify compression activities, dynamically and/or intelligently increase or decrease compression activities and/or compression ratio (often depending on factors such as available bandwidth, processing resource availability at either or both of the compression and decompression sites, lossiness requirements, and latency requirements, among other factors), and parallelize resources; having discrete and independently compressed and processed pixel groups may facilitate meeting these challenges in some embodiments. Having discrete pixel groups that are format independent facilitates meeting these challenges across a wide variety of digital image data objects formats and sizes.

As such, the compression processing is simplified and highly uniform in terms of inputs and decision-making, and reduced memory requirements are required since, in some embodiments, only the pixel data for a single line need be stored for a given compression processing step; in others, only pixel data for a given pair or set of pairs need be stored for a given compression (or decompression) processing step. Conversely, in typical compression scenarios, where maximizing compression ratios is the objective, large blocks are used, which must all be stored in memory until the entire block has been received (if not entire adjacent blocks) in order to even begin decompression of the large block. In addition, embodiments can assign different independent and smaller pixel groups to multi-component or parallelizable memory devices, which may be used on some embodiments to increase the impact and availability of parallelizable data processing.

In embodiments utilizing line-independent compression, a given compression processing step will require processing and storing locally less image data than with a large compression block (as would be used in known methods to maximize compression ratios). Such systems also wait much less time prior to beginning and then completing the compression, and subsequently the decompression, of a pixel group. Further, since some compression analysis occurs in respect of adjacent pixel-pairs, the process can be parallelized for inter-line processing, as well as between lines. In some pairwise compression, embodiments may use the first pixel in a line for a reference for compression, or alternatively embodiments may use another non-adjacent pixel; in some cases, the pairwise data may be adjacent pixels. In some embodiments, compression of, for example, pairs of pixels within a pixel group can be compressed in parallel among different cores in a multicore processor. Parallelizable processing permits the compression processing to use as much or little of the available processing and memory resources that are available to the portion of a system carrying it out (e.g. more than one core of a multi-core processor, or available RAM).

In some embodiments, the analysis is limited to pairs within pixel groups. In some embodiments, however, there may be dynamic adjustments to use groups of three or more pixels in a given independent pixel group for assessing similarity for compression. There is in general a trade-off between computation complexity and group size and, in some embodiments, the size of such groups can be increased or decreased based on throughput/latency requirements of image transmission and/or processing and/or analysis (or indeed any other factor contributing to overall latency of compression, transmission, decompression and analysis). Since the compressible pixel group may be line-based, in some embodiments systems, methods, and devices provided for herein can provide file-type, format, and size agnosticism for video and image files. It does not require specific block sizes and formats, nor specific types of information to relate corresponding pixels and/or compression blocks within or between images/frames.

In some embodiments, there is provided a system for transmitting image-based data comprising a compressor, which is a computer-based image compression device or group of devices, and a decompressor, which is a computer-based image decompression device or group of devices, which are communicatively connected over a network. In general, the network may be the internet and communications protocols may include TCP/IP; but other networks and communications protocols are possible. The compressor, in some embodiments, can comprise a stand-alone device that may be connected to a camera or sensing device; in other embodiments, the compressor is embedded within a camera or other sensing device. Examples of the compressor include but are not limited to dedicated hardware, ranging in implementation from custom silicon through to field-programmable logic devices (such as FPGAs, ASICs, and other fully programmable through to semi-customizable hardware devices), embedded processors (such as the industry standard x86 chipset provided by Intel, or the industry standard ARM chipset provided by ARM Holdings), through to any other kind of processing equipment with sufficient programmability and capacity to be able to provide compression services.

In embodiments, the compressor compresses digital image data objects. The digital image data object may be any digital representation of an image comprising pixels. The term digital image data object as used herein may refer to data files, data objects, other data types, and possibly components thereof. For example, frames of a video data file can each comprise a digital image data object. The term "object" is not intended to be limited to object-oriented data constructs, but rather to include a broad range of data constructs for representing an image in a digital data manner. In some cases, the digital image data objects may include a data representation of a visual image taken by a camera, but it may include other non-visual representations rendered from other types of sensors (e.g. heat sensors, motion detectors). Some examples of digital image data objects include but are not limited to images as used in the field of transportation (such as self-driving or Advanced Driver Assisted System (ADAS) cars, trucks, or other vehicles), remote imaging (such as may be found in satellite systems, surveillance systems, military applications), industrial robotics and inspection system (such as those found on manufacturing assembly lines), and in the most general application, any system requiring an array representation of real world data that must be compressed (by example, remote sensors that measure ground height, or electromagnetic field density, or radiation, or any combination of any measurable quantity). Other non-visual representations may include a network or a plurality of sensors associated with a plurality of objects that may be constantly changing in real-time, in respect of which a large amount of data need be transferred and analysed with very low latency in order to make decisions; such a plurality of sensors may include the tracking of vehicle or train traffic across a city, sensors associated with an industrial plant and the various subsystems associated therewith. To the extent that such large data is aggregated, transmitted, and remotely (or centrally) analysed, and very low latency analysis and decision-making is required, for example on the basis of machine- or computer-based analysis, the intelligent use of compression/decompression techniques may be applied to such non-visual digital image data object representations. In some embodiments using machine-based analyses, mathematically lossless compression may be utilized since machine-based analyses may be much more sensitive to compression-based losses in the original image than would analysis by human eyes, which in turn can adversely affect their decision making. For example, block-based encoding techniques introduce blocking artifacts that are not visible to human eyes but may affect machine-based algorithms. In some embodiments, human-based analyses, such as the medical imaging market, mathematically lossless compression may be required. Loss in an image analyzed by a may have a requirement of zero loss from compression.

In some embodiments, the image compressor is configured to independently compress at least one independent pixel group from the digital image data object. In general, the compressor will compress multiple, if not all, pixel groups, however, in some embodiments, the compressor may only compress a very small number of pixel groups, including zero groups, if it determines that compression will provide no overall latency benefit given the state of various factors, which may include network availability, bandwidth, and other conditions, processing resource availability and competing demand (including for data processors, memory, and communications interfaces), as well as requirements relating to the digital image data object itself or the application in which it is used (for example, some applications may require extremely low latency, where as others may have more relaxed latency requirements—which may change over time for the same types of images).

In some embodiments, each independent pixel group can, for example, be a line from an image, a within-line pixel group, or any grouping of any two or more pixels from anywhere in the image. For example, image "hot spots", which may share some characteristic or may be a predetermined specific group of pixels from within an image, can comprise an independent group. The compressor, for each group, either compresses or determines not to compress each group (and communicates the uncompressed pixel group without compression) independently of one another. As such, the compressor can compress, process, and transmit pixel groups either or both of in parallel and without waiting for any compression/processing/transmission of other pixel groups. Among other benefits, this permits some embodiments to dynamically scale compression activities and compression ratios to only that which would be required depending on available bandwidth, latency requirements, and processing resource availability. Indeed, in some embodiments, compression, transmission, decompression and analysis of certain pixel groups within a given image may be prioritized, and be processed as such in advance of even other lower priority pixel groups from prior images.

For example, the compressor is configured in some embodiments to automatically detect increased bandwidth availability (or other changes in network conditions, compression and decompression device demands and availability, and application requirements). To the extent that a high degree of compression will not result in significantly faster transfer rates of the pixel groups or digital image data objects (or overall processing times), the compressor may be further configured to: elect not to compress certain pixel groups up to the extent that such a failure to compress will not impact transfer or overall processing rates, to change the number of pixels associated with the independent pixel groups, to selectively compress only a subset of the data components in the pixel data related to the pixels in the pixel group (e.g. only the R and the G values in and RGB encoding), and to apply or not apply additional compression techniques to compressed pixel data (e.g. Golomb-rice).

In some embodiments, the compressor is configured to replace at least some pixel data for at least one pixel from each independent pixel group that is being compressed with a compressed value. In general, this comparison value is one or more mathematical operations that is indicative of a similarity (or a difference or a ratio) between the replaced pixel data and corresponding pixel data in a reference pixel from the independent pixel group. These mathematical operations are typically simple in nature in order to reduce complexity, such as identifying a difference or a ratio, but can have some increased complexity, depending on compression improvement tradeoffs.

For example, consider a set of pixels that are represented by a 16-bit gray scale value. In some images, there is little variability between adjacent pixels. Transmitting the entire 16-bit value for each pixel is therefore considered wasteful, in that the content can be represented more compactly. By, for example, establishing a first reference pixel (for example, the first pixel on the line), and then transmitting the differences in intensity between the first pixel and the second pixel, less data can be used. Continuing the process, the next transmitted data element is the difference in intensity between the second and third pixel, and so on, until the end of the line. Due to the nature of the images (in our example, we assumed little variability between adjacent pixels), the absolute values of the difference are small. As a trivial example, consider a line with 5 pixels with the values 31045, 31048, 31044, 31030, 31031. Uncompressed, the total data required is 5×16=80 bits. But by computing the difference between the values, the transmitted data is now 31045, 3, −4, −14, 1 (the first pixel value must be transmitted in its full representation because it serves as the basis for the rest of the values that follow). As a trivial compression, it is possible to express the $2^{nd}$ through $5^{th}$ difference values in 8 bits rather than 16 bits, resulting in a total data size of 16+4×8=48 bits. Other, more advanced compression methods, such as Golomb-Rice coding are known in the art and result in even more efficient compression.

In some embodiments, there is a pairwise comparison occurring between data associated with a pixel (i.e. pixel data) from the pixel group and pixel data from an adjacent reference pixel. In other cases, there may be a single or other number of predetermined reference pixels that can be used for all or some of the pixels to be compressed (e.g. multiple pixels having compressed data within a pixel group may share the same one or more reference pixels). Additional combinations of reference pixels and compressed pixels can be used in some embodiments. For example, the same pixel (such as the first, or any other pixel) can be used as a reference to all other pixels in each pixel group. Any pixels can be used as reference pixels for any one or more compressed pixels, including a pixel that will be or has been compressed.

In some embodiments, the compressor is configured for transmitting over a network compressed independent pixel groups comprising pixel data for the at least one reference pixel and comparison values corresponding to the replaced pixel data. In embodiments, the compressor comprises a communications bus for receiving digital image data objects.

In some embodiments, the compressor receives digital image data objects from a sensor or camera that is part of the compressor; in other words, both the camera or sensor and the compressor are components of the same system. In other cases, the compressor may be configured as a system on a chip or a system on card, which is mounted onto or connected to (at least initially) a discrete device or devices for collecting digital image data objects.

In embodiments, the compressor is configured to, after compression of a given digital image data object or independent pixel group (which may include determining to transmit some or all of the pixel data for pixels in a given pixel group in an uncompressed state), the post-compression process independent pixel group is communicated by the compressor over a network. In some cases, the transmission may be completely independent of whether other pixel groups from the same digital image data object have been compressed, processed or even received by the compressor. The compressor may, in some embodiments, comprise a communications bus (which may be any system for communicating data from or between computing systems, including but not limited to those conforming to the USB, GPIB, VXI, PCI, PCIe, AGP, FireWire, and other serial and parallel interface standards) and use standard or customized communications protocols to communicate over the network. These may include industry-standard communications protocols such as GPIB, VISA, TCP/IP, UDP, RTSP, TFTP, IPv4, IPv6, WiFi (802.11 series of protocols), Ethernet, as well as others. In some embodiments, the compression may be completely independent of the transfer medium; a file system can constitute a transfer medium in that a compressed file can be stored in a storage system using a file system, and then accessed and decompressed. In such file system example, there are embodiments that are not necessarily transmitted over a network but rather compressed, stored, and then accessed and decompressed for analysis; in such cases, latency requirements may be assessed either or both from image acquisition, through compression, storage, access, decompression, analysis—or alternatively, from access, decompression, analysis.

In some embodiments, the data corresponding to each independent pixel group may be communicated in parallel and/or independently of one another. As such, independent pixel groups may be decompressed and then analyzed (in accordance with a given use context or application layer implementation) upon reception in any order of receipt, or indeed whether or not other independent pixels groups are received in any event. In cases where only portions of images need to be analyzed at the decompression location, this provides an ability to reduce the amount of data being communicated and can therefore be useful in reducing overall latency in processing digital image data objects at a remote location from image collection. While in some embodiments, pixel data may include pixel location data, including relative pixel location data, in some embodiments, pixel location is implicitly included in each pixel group and/or in data from each pixel.

In some embodiments, there may be provided an image decompressor that is communicatively coupled to the same network as the image compressor. The communications between the compressor and decompressor may be connection-oriented with one another (e.g. TCP, where each communication constitutes a message and an acknowledgement of the message) or connectionless communication (e.g. UDP). Other communications protocols may be used. In some embodiments, the decompressor may comprise similar communications bus technology as the compressor for receiving the compressed (or not compressed, as the case may be) independent pixel groups. In some embodiments, the decompressor is configured to independently, for each compressed independent pixel group, recalculate the pixel data for each comparison value that is a compressed representation of the original pixel data using that comparison value and reversing the compression algorithm and/or mathematical operation on the corresponding pixel data in the reference pixel and then replacing each such comparison value with the calculated pixel data. In some embodiments, the decompressor is a purpose-built device comprising specialized processing componentry, memory, and at least one communications bus. In other cases, it may be embodied as a repurposed computing device comprising processing componentry, memory, and at least one communications bus, which can have software loaded into memory that provides instructions to the computing device to carry out the necessary functions of the decompressor. Examples of the decompressor include but are not limited to dedicated hardware, ranging in implementation from custom silicon through to field-programmable logic devices (such as FPGAs, ASICs, and other fully programmable through to semi-customizable hardware devices), embedded processors (such as the industry standard x86 chipset provided by Intel, or the industry standard ARM chipset provided by ARM Holdings), through to any other kind of processing equipment with sufficient programmability and capacity to be able to provide compression services.

In some embodiments, each independent pixel group is made up of pixel data from a specific group of pixels from a given digital image data object. In some cases, the group of pixels is a line of the image represented by the digital image data object. This is used as the independent pixel group in some applications since this can be automatically determined by said image compressor irrespective of the image format and size. Provided digital images have lines, or analogous groups of spatially related pixels, the system can compress, transmit, decompress and process each group independently of one another, and can determine such groups of pixels, in a manner that is format independent. Information relating to compression is not required between different independent pixel groups; while this may impact the upper limits of compression ratio, it also means that compression, decompression, and processing can occur completely independently and in a simplified manner, without requiring reference information between different groups of pixels, and without the decompression and analysis component having to wait for very large and interrelated groups of pixels prior to beginning decompression and analysis. In some embodiments, there is thus provided a balance, and in some cases a tunable balance, between optimal compression activities and overall processing latency.

In some embodiments, at least two independent pixel groups are independently compressed in parallel by the image compressing device. The image compressor will comprise a number of processing and other computing resources, some of which can carry out their function in parallel ways. For example, in cases where the compressor has processing componentry that includes multicore processors, individual cores can be designated or allocated for carrying out independent and parallel compression processes; indeed, the processor may, depending on in some cases whether there are competing processes that can be deferred, allocate a portion of the cores to compression and allocate some cores to other related or unrelated activities. In some cases, the compressor may comprise more than one processor, which processors may be single or multi-core. This same ability to split resources applies to other computing resources such as memory (in which data from independent pixel groups can be accessed and stored independently, such as for example, ensuring that certain pixel data is optimized for in-cache memory queues for rapid access) and communications buses (many buses have multi-queue and multi-route transport capabilities). In sensors employing multiple 'taps' (parallel input of different parts of the image), each 'tap' can be assigned its own compressor also; so parallelizable in compute, communicate and storage. Some image data constitutes multiple "taps", which refers to simultaneously providing data from different parts of the image. A single tap would give you a line or a region, a dual tap would simultaneously provide data for two segments (lines or segments of pixels from within a line or group of lines), a four-tap would simultaneously provide data for four lines or segments. Embodiments herein may use an approach in pixel groups wherein compression/transmission/decompression can take place in parallel for each given tap. So in a four tap, each tap, or dimension therefrom, is processed in parallel.

In some embodiments, the image compressor can dynamically assign available processing resources in said image compressor for independently compressing independent pixel groups. The dynamic assignment may utilize environmental or other characteristics to allocate specific, additional, or fewer processing resources; these characteristics include, but are not limited to, available bandwidth, acceptable processing latency time for a given digital data image file application, and priorities of competing processes. For example, when latency requirements are extremely demanding (i.e. the image analysis requires an overall very low latency to meet application requirements), the compressor can designate additional processes for parallel processing; when latency requirements are less stringent, the compressor may reduce the number of processing resources for parallel compression.

Similarly, in some embodiments the decompressor independently decompresses, and in some cases carries out image analysis (comparative with respect to prior images or otherwise) in parallel using available resources, such as multiple processors and/or multiple cores in one or more processors. In some embodiments, the image decompressor dynamically assigns available decompressor processing resources for independently decompressing compressed independent pixel groups in parallel, and resources can also be assigned to processing for analysis. In some embodiments, the decompressor may be configured to dynamically and selectively assign resources to decompression or data analysis depending on whether latency requirements are being met.

For example, in some embodiments the decompressor processing resources are dynamically assigned to identifying predetermined image characteristics in said digital image data objects. Image analysis may be carried out by the decompressor (or in some cases the same or associated computing device), although in some case, visual inspection by a human operator may be acceptable. Particularly in cases where the image analysis is carried out by a computing device, there is often a very low tolerance, if not zero tolerance, for loss in data due to compression. Whereas a human operator will either not detect a small loss in data or be capable of distinguishing a data loss from a true change between subject matter or conditions in two subsequently captured images, a computing device will be much more likely to detect such a loss in data and have significant difficulty in distinguishing between a true change in images and such data loss. As such, in addition to lower latency requirements, image compression/decompression and analysis in many embodiments disclosed herein require mathematically lossless compression.

Examples of applications where this may be required may include circumstances where images collected by a camera, or other data collected by sensors or computer, and then must be assessed in real-time by a remote computing device, which may or may not send signals either back to the originating or other computing device (i.e. the compressor or the camera/sensor associated therewith or a braking system in a self-driving car). One example may include an automated driving system, including steering and braking systems: using images to detect objects impeding a self-driving vehicle require instantaneous detection of changes in images, with instructions to apply brakes, directional steering, or acceleration returned to the vehicle in real-time with little or no tolerance for failure, error, or delay. Other examples include autonomous robotics, where the performance of the system is directly related to the accuracy of sensors, including the vision system. If there is a lot of latency, then the robotic system cannot safely move as quickly as it can when the latency is reduced—the timeliness of the data directly feeds into the speed of the physics calculations used to control the robot. Along similar lines, guided missiles that must rely on terrain recognition (in case of the enemy jamming the GPS, for example), need low-latency images simply due to the incredible speed they are flying at. Industrial inspection is another example: the quicker a machine can have access to sensor data, the quicker it can make an inspection decision, which in turn means the quicker a production line can run through the automated inspection system. Even when humans are consuming the digital images, latency coupled with lossless compression can be of utmost importance: 'drive by wire' technology where humans drive vehicle based on camera input (instead of looking out from a vehicle out of a window, they look at monitors displaying images captured by sensors outside of the vehicle), the latency between sensor capture and display (which includes compression and decompression) has very little tolerance for a human since a large latency can introduce disparity between the experience or reality of driving and what is observed by the human. Other applications may include any automated operation of machinery, devices, vehicles, any other automated systems, that rely on sensory data to react to changes in their environment, or alternatively in requirements that may cause a reaction to sensed information from the environment (even if that information has not necessarily changed).

In some cases, remote analysis of digital image data objects in which images, or other sensory data, is transmitted to a remote analysis location, and, upon detection of certain characteristics in such images or sensory data, rapid response and/or action may be required in a number of scenarios. Particularly when (a) the images or sensory data comprise large amounts of data and/or (b) the analysis is machine-based, maximizing compression ratios must, in some embodiments, be balanced against available bandwidth (or other transmission factors) to ensure that compression activities do not exceed the effective benefit of such compression for transmission thereby impacting the overall latency of such rapid analysis and/or response. In such cases where compression exceeds an effective overall benefit, additional compression may increase latency of the overall image analysis since the system spends additional time and processing resources compressing and decompressing, and processing resources on the decompressor (or at the decompression location) which would otherwise be available for image analysis are utilized for decompression.

In some embodiments, the image analysis is configured to detect predetermined image characteristics in the received pixel groups, after decompression and, in some cases, reassembling the pixel groups into an image. It should be noted that such reassembly is not always necessary in some embodiments, as corresponding pixels or pixel groups can be analyzed, including by comparison to one another. Although, images and image pixels may be analyzed in some cases, the underlying data used to generate images can be used to carry out the analysis. In some cases, this such image characteristics may comprise of differences between pixel data in corresponding pixels in two related images, such as subsequently captured images. For example, if an image changes due to something entering the field of vision of a camera or other sensor, which would then change at least one pixel as between subsequent images of the same field of vision. In some cases, the analysis may be a comparison of pixels in the same image (e.g. a change in the image captured from a given field of vision relative to other parts of the same image). The image characteristics may comprise of a change or the passing of a predetermined or calculated threshold of one or more values associated with pixel data or a component of pixel data. Indeed, not all pixel groups need be analysed in some embodiments, as pixel groups associated with higher priority characteristics, may be analysed prior to or even in the absence of analyzing other pixel groups in the same digital image data object or even other digital image data object representing previously captured images or data.

In some embodiments, the comparison value, that is the value determined through comparison using a mathematical or other comparison operation, is a compressed mathematical comparison of the replaced pixel data and corresponding pixel data in the reference pixel, where such compression is mathematically lossless compression. In some embodiments, the compression of compression data objects requires mathematically lossless compression, or near lossless compression. Such lossless compression has a requirement that the original data be able to be reconstructed from the compressed data without any difference therefrom; or at least all data from such compression data objects that may be required for a subsequent analysis or other processing be capable of being perfectly reconstructed without any difference from the original. By contrast, lossy compression permits reconstruction only of an approximation of the original data, though this usually improves compression rates (and therefore reduces file sizes). Such lossy compression may be acceptable in some media applications, such as human-viewed or interpreted image or video files; for example, a dropped frame in a streaming video will have minimal impact to a viewer of that video (and, in fact, may not be perceptible) or reducing the chroma samples in an image is not visually detectable by human eyes due to the lower sensitivity of the human visual system to chroma data (i.e. color) compared to luma (i.e. intensity). Likewise, two images differing by a single pixel would not be detectable by a human viewer. In compression that may permit lossy compression, it is a general observation that increased compression ratio generally results in increased data loss.

On the other hand, lossless data compression is required in some applications, particularly those that use machine-based analysis of digital image data objects or medical or legal reasons or other situations where even the human must see what was captured by the sensor. Lossless compression is used in cases where it is important that the original and the decompressed data be identical, or where deviations from the original data could be deleterious. Examples of such applications include when comparing files for changes over time; some applications may utilize changes to trigger some other action. Any autonomous systems, such as robots, autonomous or driverless cars, or machine-augmented human operated machinery (including automobiles), which utilize cameras or other sensors to detect changes that might cause an event to occur, such as the application of brakes, raising an alarm, changing a direction of motion, etc., may not be able to distinguish between data loss and true changes in the related image.

In some embodiments, the mathematically lossless compression is Golomb-Rice compression. Golomb coding is a lossless data compression method using a family of data compression codes; sequences following a geometric distribution will have a Golomb code as an optimal prefix code, making Golomb coding highly suitable for situations in which the occurrence of small values in the input stream is significantly more likely than large values. Golomb-Rice coding denotes using a subset of the family of Golomb codes to produce a simpler prefix code, sometimes in an adaptive coding scheme. Golomb-Rice can refer either to that adaptive scheme or to using a subset of Golomb codes. Whereas a Golomb code has a tunable parameter that can be any positive integer value, Golomb-Rice codes are those in which the tunable parameter is a power of two. This makes Golomb-Rice codes convenient for use on a computer since multiplication and division by 2 can be implemented more efficiently in binary arithmetic. Other lossless compression techniques may be used, including Huffman coding and arithmetic coding. In embodiments, Golomb-Rice has provided a simple compression that requires a reduced level of compression activity, and thus a reduced level of processing resources, and yet provides mathematically lossless compression.

In some embodiments, the number of pixels in any given independent pixel group may be selectively determined, and even in some cases dynamically adjusted in real-time, depending on available transmission bandwidth. In some cases, as transmission conditions change over time, the benefit of various levels of compression will vary. For example, if 10 Gb/s are available and uncompressed digital image data objects and/or a given image analysis application requires 15 Gb/s, then compressing digital image data objects is necessary but to doe so to a compression ratio where they would require less than 10 Gb/s means that not only additional compression is occurring that achieves no practical benefit, but additional decompression must occur at the receiving end. As such, by adjusting the number of pixels in a given pixel group (either to a predetermined value prior to compression of a given digital image data object, or to a number that is determined and varied in real-time), by only selectively compressing some independent pixel groups, by compressing on a subset of components in a given type of pixel data, or other compression optimizations supported herein, all of which may be adjusted depending on, in some embodiments, prevailing conditions impacting latency, an optimal compression can be utilized that minimizes or eliminates the impact on overall latency from compression/decompression.

In some embodiments, each respective independent pixel group in the digital image data object is selectively compressed or not compressed depending on at least one of the following: available transmission bandwidth, compression latency, decompression latency, digital image data object processing latency, available compression-side processing power, available decompression-side processing power, and image-analysis-processing power (if different from the decompression-side processor), among other factors detectable by the system which can impact overall latency. The compressor may be configured to automatically measure or determine system and application conditions and requirements, but also those of the applicable networks, that would impact overall latency. To the extent that additional compression is not required because, for example, there is an excess of transmission bandwidth or maximum processing latency requirements are high enough, the compressor can selectively elect not to compress some or even all pixel groups. Such conditions may occur when and if the applicable network is characterized by transmission latency and/or throughput that will not result in a backlog or queue of received independent pixel groups at the decompressor. Independent transmission and processing permits some embodiments to provide image data analysis in parallel and efficiently.

In some embodiments, the pixel data for each pixel comprise one or more pixel data components. In the simplest case, the pixel data will comprise a single data component, for example, a grayscale value. In others, there are multiple data components; for example, a given pixel will comprise of R, G, and B pixel data component (each of which constitute RGB pixel encoding format components). Other pixel encoding formats may include, but are not limited to, the following: grayscale, RGB, RGB888, RGB656, and various YUV, or Bayer formats. In some embodiments, the pixel data may be divided into portions of bits that make up the overall pixel data object, each portion of which can be considered a component.

In some embodiments, the compression of pixel data from any given pixel group may be restricted to specific subset of pixel data component. In some embodiments, the selection and number of pixel data components that are compressed may be dependent on compression impact on overall processing latency. In some embodiments, a predetermined subset of components across all pixel data for every pixel in an independent pixel group can be selected in advance, or alternatively, in some embodiments, the selection of which components and/or how many components should be compressed can be determined dynamically for each independent pixel group. In other words, prior to compressing pixel data for a given independent pixel group, the compressor may (a) make a determination may be made as to whether a given pixel group should be compressed; and then (b) if so, because for example a particular parameter measuring the benefit of such compression is less or more than a given threshold relating to some permitted overall latency value, make a further determination if a subset of components of the pixel data associated such given pixel group should be compressed while leaving other components uncompressed. In some embodiments, this and other functions disclosed herein may provide additional fine-tuning between the trade-off that may be required between compression and compression complexity, on the one hand, and overall latency (where such overall latency has contributions from some or all of compression, transmission, decompression, and analysis) and use of bandwidth on the transmission channel on the other hand.

As an exemplary embodiment for image processing (i.e. compression, transmission, and decompression, as well as, in some cases, analysis), monochrome image formats may be applied to each image plane separately. Images are compressed one pixel at a time, one line at a time. The first pixel (called pix0) is always uncompressed (i.e. it is untouched) in such exemplary embodiments. The next pixel's (pix1) difference in value from the pixel to the left of it on the image is recorded (called diff0). Subsequent pixel value differences are also recorded (diff1 for the difference between pixel 2 and pixel 1, diff2 for difference between pixel 3 and pixel 2 . . . diff[n] for difference between pixel[n+1] and pixel[n]). Once the line is done, the differences are put through Golomb-Rice or other run-length coding. The bitstream is the quotient value from Golomb-Rice followed by the codes produced. An escape code is agreed on for when unitary portion of Golomb-Rice code is larger than the size of pixel.

In some embodiments, the compression and decompression may be configured to process any one or more of a plurality of pixel value degrees of freedom ("DOF"), and which may also be referred to herein as pixel data components. For example, a single pixel DOF may include, for example, grayscale values; another may include RGB values (and therefore comprise 3 DOFs). In some embodiments, processing methodologies discussed herein may deal only with single DOFs or multiple DOFs within, pixel pairs (or larger within-line pixel groups) and compare one or more of the DOFs at a time. In some embodiments, there may be a comparison of frequency domains and redundancy in the frequency domain. It is possible in some embodiments to translate to grayscale from RGB, but the opposite is only permissible in cases where some loss is permitted.

Embodiments may be scalable to available communications limitations. In some embodiments, improved compression ratio is only helpful to the point where the communications latency approaches latency resulting from compression and/or decompression processing, and or post-decompression data processing. As such, the system can, based on available communications resources, associate compression efforts with said communications resources; in some embodiments, this association can be dynamic as the capacity of such communication resources changes with time. Communications networks are often shared and the availability for transmitting the image/video data in question may fluctuate, thereby impacting the effectiveness of increasing or decreasing compression ratio on the overall latency resulting from some or all of compression, communications, decompression, and data processing.

Given a compression ratio, which can be derived from image information (pixel depth, plane+frame rate) and the available channel bandwidth, the compression process keeps track of the current overall compression ratio achieved as it compresses each line. When the compression ratio goes above that required by a threshold, it leaves the next line (assuming the independent pixel group constitutes a line of pixels in the applicable image) completely uncompressed, and when the compression ratio is below the target, it compresses the line as specified before. As such, the pixel groups can be compressed or uncompressed.

In embodiments, decompression of image/video data is analogous to compression—but in reverse: decompression can occur on a much more granular scale since there is no need to wait for large compression blocks prior to beginning decompression processes (essentially each line can be independently decompressed). In addition, each line can be processed in parallel from one another (i.e. not inter-line), depending on, and in some cases scalable to, the available resources at the decompressing computer system assuming the data for the lines are available.

Given that the decompressing system, as discussed below in further detail, may often require increased processing burden from analyzing the image/video data, the reduction of decompression requirements may be required for reasons that are separate from the reduction in latency. Low-latency in compression, communication, and decompression processes may become moot if the decompression processing resources (including memory usage) imposes a burden that interferes with the data processing requirements associated with data analysis. As such, the adaptable, scalable, parallelizable, simplified, granular, and block-independent decompression provided hereunder may, in some embodiments, provide for image/video data analysis that meets the high response needs of some digital image data object applications.

Some embodiments utilize line-based compression and decompression. Other embodiments may use larger or smaller units for compression and decompression; however, such larger or smaller units must, in some embodiments, provide inter-group independence. In some cases, the size may be adjusted according to throughput and latency requirement or limitations of image data processing.

In some embodiments, the decompression is the reverse of the compression: a line, or other independent pixel group, is received; the Golomb-Rice quotient extracted; the first pixel, or other reference pixel, is decompressed; for subsequent pixels, the Golomb-Rice code is decoded, arriving at a differential value of pixel[n] and pixel[n−1]. The difference gives value of pixel[n]=pixel[n−1]+difference. If an escape code is reached, then value of pixel[n] is as is (i.e. uncompressed). If the entire independent pixel group is signed as uncompressed, it is taken as is.

Modern uses of video and image analysis require real-time or near real-time analysis. In order to implement such analysis optimally and efficiently, machine-based techniques of image/video data analysis have been developed. Such techniques have a number of factors that differ from other uses of video/image data. Machine-based analyses are not limited to visual limitations that have been built-in to many conventional image/video compression techniques. Whereas, for example, visual analysis of changes to an image/video is limited at approximately 20 ms/frame, machine-based analysis may be able to handle (and in fact require, depending on the application) much higher speeds.

Another distinction arising from real-time machine-based analysis is that, unlike most conventional image/video analysis, there may be significant post-reception data processing. Most conventional processes involving video/imaging generally utilizes at most streaming playback and/or local data storage. Machine-based analysis, particularly in real-time, may require complex analysis of the video/image data, and/or the underlying machine-readable data associated with the video/image data in real-time. This means that buffering—even for a few seconds, which would have little or no practical impact on a streaming or receiving a static file—is not permitted. Some of the data that may be associated with the video/image data may include metadata, performance characteristics, network traffic information, and other extraneous data. In addition, more data from subsequent images (or video frames) may be following quickly, and dropping such data, as would be permitted in many streaming or visually assessed image files, is often not an option. As such, in addition to improved latency associated with sending and receiving compressed data, the receiving computing device cannot be overly burdened with the decompression processing.

In some embodiments, the system can flexibly associate processing resources (including cores on processors, local primary and secondary memory, such as RAM or disk, respectively, and communications interfaces) for decompression in a manner that accounts for post-processing resource consumption. In other embodiments, the decompression processing burden is minimized through independent line-based decompression, which may, in some embodiments, use pair-wise (or other n-sized subsets) intra-line decompression techniques, both as described above. The decompression processing techniques, which may further utilize run-length methodology of decompression in some embodiments, thus minimizing decompression processing, in part through reduced complexity.

With reference to FIG. 1, an image 300 is represented digitally by selecting a set of dimensions, an X dimension 210 (width) and a Y dimension 220 (height). The values of the dimensions are arbitrary, and are determined by a number of factors, including such things as camera resolution. One common value of commonly used image files (which is the compression object in this example) is a width of 640 pixels by a height of 480 pixels. The image 300 is encoded into a number of pixels 100. The number of pixels can be computed by multiplying the "x" dimension 210 by the "y" dimension 220; in the previous example of 640×480 this means that there are 307200 pixels in the image.

Figure 2:
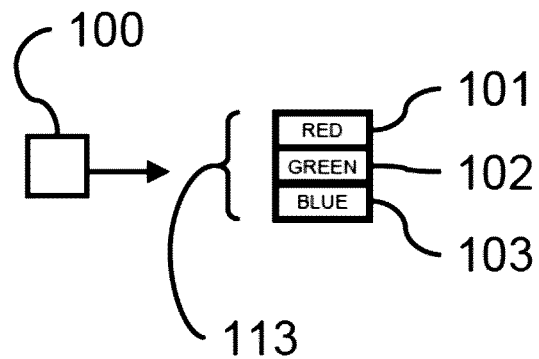
FIG. 2 is a conceptual representation of a data unit from a compression object that can be used in accordance with another embodiment of the instantly disclosed subject matter.

In FIG. 2, a pixel 100 encoded in RGB encoding 113 is shown as consisting of three components, a red 101 component, a green 102 component, and a blue 103 component. As is known in the art, the red 101, green 102 and blue 103 components can be combined to give a representation of the colour of the pixel 100. In some embodiments, the pairwise compression may elect to compress a subset of pixel data components, including any or all of each of the RGB data values for compression compared to its related compression pair. For example, the R-data of a given unit can be compared to the R-data of the other member of the compression pair; alternatively, any of the G-data and B-data can be compressed or not. The number of the pixel data components used within compression groups. can be dynamically selected depending on dynamic compression requirements.

Figure 3:
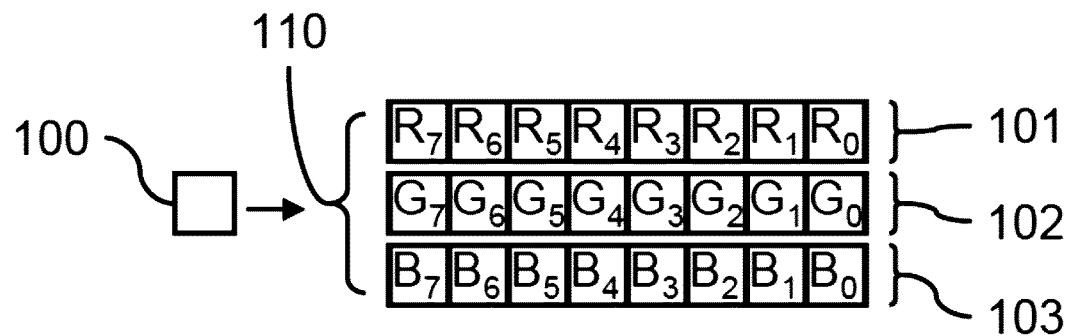
FIG. 3 is another conceptual representation of a data unit from a compression object that can be used in accordance with another embodiment of the instantly disclosed subject matter.

With reference to FIG. 3, there are further options for the encoding of each of the pixel 100 components. The RGB888 encoding 110 refers to the fact that there are eight bits used for the red 101 component. These bits are indicated as R7 through R0 in FIG. 3. Similarly, there are 8 bits used for the green 102 component (designated as G7 through G0), and 8 bits for the blue 103 component (B7 through B0). Each component, because it consists of 8 bits, can represent the values 0 through 255 inclusive (256 distinct values). Therefore, in the RGB888 encoding 110 there are 16777216 possible colours (256×256×256). In some embodiments, the pairwise compression may elect to compress a subset of pixel data components, including any or all of each of the RGB data values for compression compared to its related compression pair. For example, the R-data of a given unit can be compared to the R-data of the other member of the compression pair; alternatively, any of the G-data and B-data can be compressed or not. The number of the pixel data components used within compression groups. can be dynamically selected depending on dynamic compression requirements.

Figure 4:
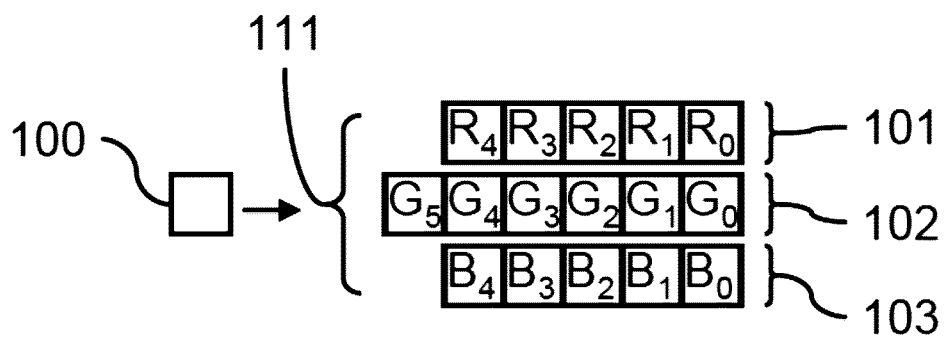
FIG. 4 is another conceptual representation of a data unit from a compression object that can be used in accordance with another embodiment of the instantly disclosed subject matter.

With reference to FIG. 4, a different colour encoding scheme 111, called RGB565 is shown. In this scheme, 5 bits (R4 through R0) are used for the red 101 component, 6 bits (G5 through G0) are used for the green 102 component, and 5 bits (B4 through B0) are used for the blue 103 component. The red 101 and blue 103 components have 32 possible values each, and the green 102 component has 64 possible values. This RGB565 encoding 111 therefore yields 65536 possible colours (32×64×32). Representing the pixel value using the three colours red, green, and blue is only one of many possible representations. In some embodiments, the pairwise compression may elect to compress a subset of pixel data components, including any or all of each of the RGB data values for compression compared to its related compression pair. For example, the R-data of a given unit can be compared to the R-data of the other member of the compression pair; alternatively, any of the G-data and B-data can be compressed or not. The number of the pixel data components used within compression groups. can be dynamically selected depending on dynamic compression requirements.

Figure 5:
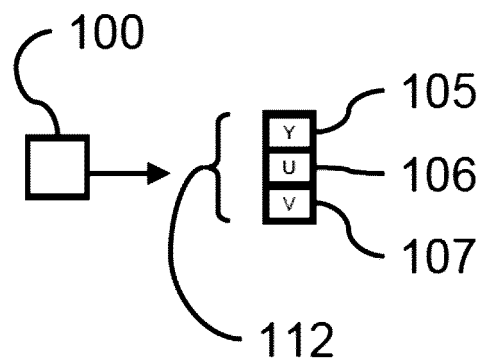
FIG. 5 is another conceptual representation of a data unit from a compression object that can be used in accordance with another embodiment of the instantly disclosed subject matter.

With respect to FIG. 5, another encoding scheme 112 known as "YUV" encoding is commonly used. In this scheme, three components (or dimensions), called Y 105 (representing luminance, a measure of the brightness of the pixel), U 106 (representing chrominance along the blue/yellow axis), and V 107 (representing chrominance along the red/cyan axis) are used. As with the RGB 113 format from FIG. 2, the YUV format 112 shown in FIG. 5 gives a representation of the colour of the pixel 100. In some embodiments, the pairwise compression may elect to compress a subset of pixel data components, including any or all of each of the YUV data values for compression compared to its related compression pair. For example, the Y-data of a given unit can be compared to the Y-data of the other member of the compression pair; alternatively, any of the U-data and V-data can be compressed or not, in an analogous manner. The number of the pixel data components used within compression groups. can be dynamically selected depending on dynamic compression requirements.

Figure 6:
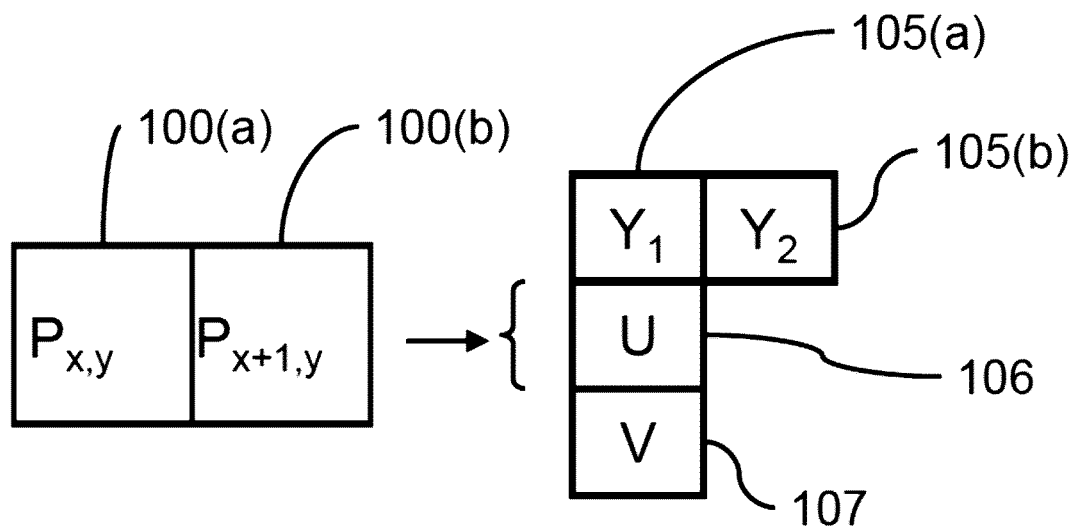
FIG. 6 shows conceptual representation of data units from a compression object that can be used in accordance with another embodiment of the instantly disclosed subject matter.

With reference to FIG. 6, it is important to understand that the mapping between an arbitrary pixel 100 and the luminance 105 and chrominance 106, 107 values is not necessarily done on a one-to-one basis as it was with the RGB format 113. FIG. 6 illustrates a one-to-one correspondence between the pixels Px,y 100(*a*) and Px+1,y 100(*b*) and their respective luminance values Y1 105(*a*) and Y2 105(*b*). Note, however, that both pixels Px,y 100(*a*) and Px+1,y 100(*b*) share the same chrominance values U 106 and V 107. This is representative of one of a plurality of YUV format 112 encoding schemes.

Figure 7:
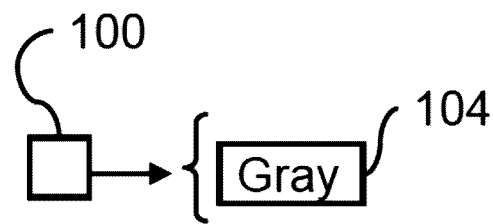
FIG. 7 is another conceptual representation of a data unit from a compression object that can be used in accordance with another embodiment of the instantly disclosed subject matter.

Monochromatic images are illustrated in FIG. 7, where the pixel 100 contains a single value, the grayscale level 104. The number of bits used to represent the grayscale level 104 indicates the smoothness of the grayscale transitions. If only one bit is used to represent the grayscale level 104, then there are only two values possible—on or off, corresponding to white or black, respectively. If 8 bits are used, then there are 256 different values (0 through 255 inclusive), representing 256 shades of gray, with 0 meaning black and 255 meaning white. As is known in the art, many other pixel representation formats are possible other than those illustrated above. In some embodiments, a subset of the 8 bits used in the above exemplary example could be selected for compression, the remaining bits uncompressed; as such, for even a pixel having only a single value, there can be subcomponents that can be utilized for compression.

Figure 8:
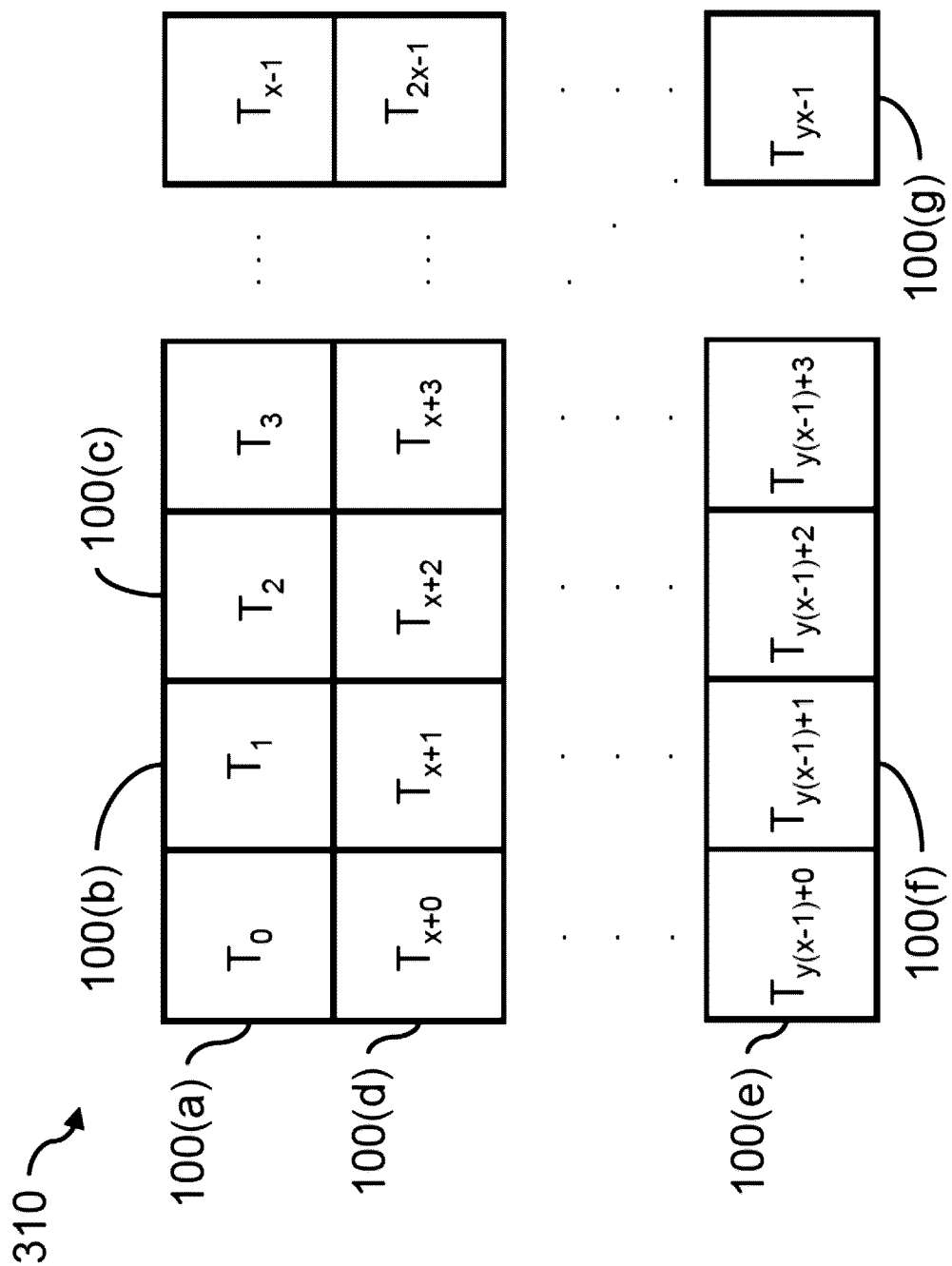
FIG. 8 shows conceptual representation of compression object data in accordance with another embodiment of the instantly disclosed subject matter.

Turning to FIG. 8, in order to understand how the image is transferred from the video source for further processing. FIG. 8 illustrates an image 310, assumed to be "x" pixels wide by "y" pixels high, that arrives serially. A first pixel 100(*a*) arrives at time T0. Then, at time T1, another pixel 100(*b*) arrives, followed by another pixel at time T2 100(*c*) and so on until all of the pixels for the given row have been received. Then, at time Tx+0 100(*d*) the first pixel of the next line arrives, and so on, as in the previous row. All rows arrive in the order and method discussed; the first pixel 100(*e*) of the last row arrives at time Ty(x−1)+0, followed by the next pixel 100(*f*) at the next time slot Ty(x−1)+1 and so on, until the last pixel 100(*g*) arrives at the time Tyx−1. Because the image is x pixels wide by y pixels high, the total number of pixels is given by multiplying the two values together. From this, in some embodiments, we can compute that using this method, the entire transmission takes x times y time periods. There are situations were entire lines of pixels arrive at once, parts of the line arrive simultaneously, or out of order.

Figure 9:
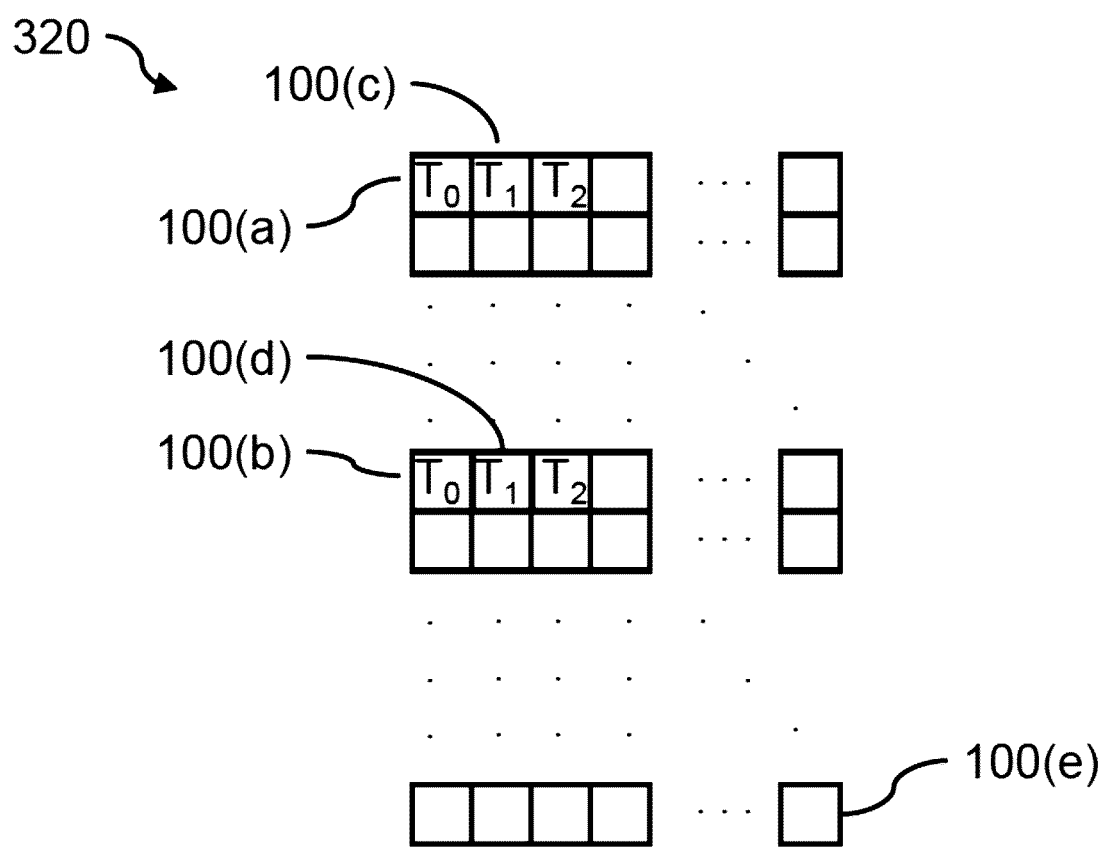
FIG. 9 shows conceptual representation of compression object data in accordance with another embodiment of the instantly disclosed subject matter.

FIG. 9 illustrates a different method of sending pixel data, called "multi-tap" 320. The hardware is able to send multiple pixels concurrently; in this case, at time T0 both pixels 100(*a*) and 100(*b*) are sent by the hardware. At the next time interval T1, two more pixels 100(*c*) and 100(*d*) are sent simultaneously. This process continues until all pixels are sent. The last pixel 100(*e*) is sent at time Tyx/2−1—that is to say, because two pixels are being sent for each time period, the entire image takes half the number of time periods (T0 through Tyx/2−1) than it would if it was sent one pixel at a time (T0 through Tyx−1).

In some embodiments there is provided a computerized method for low-latency distributed image processing. In some embodiments, the method comprises the following: receiving a digital image data object at a compressor, the digital image data object representative of an image comprising pixels; independently compressing at least two independent pixel groups by replacing pixel data for at least one pixel from each of the at least two independent pixel groups with a comparison value indicative of a similarity between the replaced pixel data and corresponding pixel data in a reference pixel from the independent pixel group; transmitting over a network compressed independent pixel groups to a decompressor; independently decompressing each compressed independent pixel group by calculating the replaced pixel data based on the respective comparison values and the corresponding pixel data in the reference pixel and replacing the respective comparison value with the calculated replaced pixel data. In some embodiments, methods may include additional steps corresponding to additional functionalities described in greater detail herein; such functionalities may include parallel processing of independent pixel groups (including compression, transmission, decompression, and analysis), parallel processing on available resources at either or both of the compressor and decompressor, and processing of a subset of independent pixel groups or of pixel data components (including a dynamic assessment based on conditions on which and how many of such components ought to be compressed for optimal overall latency). Some methods include dynamically assessing whether a given independent pixel group should be compressed or not compressed depending on any of: network conditions impacting communications throughput and/or communications latency, processing load at either or both of the compressor or decompressor, and analysis of latency requirements. In some embodiments, there may be provided feedback from the decompressor to the compressor; in such cases, an additional step of the methods disclosed herein may be to adjust compression options as disclosed above to optimize for minimal compression required to meet specific requirements.

In other embodiments, there is provided a computerized method for low-latency distributed image processing of a digital image data object defined by a plurality of image pixels. The method may comprise receiving a digital image data object, representative of an image as input to a digital image compressor. The method may further comprise the step of compressing the digital image data object by independently compressing distinct pixel groups defined amongst the plurality of image pixels into independently compressed pixel groups. In some embodiments, the independent compression provides for optimal level of compression, both within any given pixel group and between pixel groups. The method comprises, for each of the pixel groups that are compressed: computing a comparison value indicative of a similarity between given pixel data of a given group pixel and reference pixel data of a corresponding reference pixel; at least partially replacing said given pixel data with said comparison value; transmitting each of said compressed pixel groups over a digital network to a digital image decompressor; and independently decompressing at said decompressor each of said compressed pixel groups by, for each of said compressed pixel groups, recovering replaced pixel data using said comparison value and said reference pixel data.

The comparison value for some methods constitutes a comparison resulting from a mathematical operation between a particular piece of pixel data (i.e. a component of the pixel data, if there is more than one) from a pixel to be compressed and the corresponding pixel data from a reference pixel. In some cases, each such compression operation uses a different reference pixel (e.g. in the case of pairwise compression) and in some different pixels for compression may use the same reference pixel.

In some embodiments, there is provided a system, wherein the embodiment includes the compressor and decompressor. In other embodiments, there is provided a compressor for transmitting digital image data objects for low-latency image processing, the compressor comprising: a processing component; and one or more communications interfaces for receiving and transmitting; wherein the compressor receives a digital image data object, said digital image data object being a digital representation of an image comprising pixels; and wherein the processing component independently compresses at least two independent pixel groups by replacing pixel data from at least one pixel from each of the at least two independent pixel groups with a comparison value indicative of a similarity between such pixel data and corresponding pixel data in a reference pixel from the independent pixel group.

In other embodiments, there is provided a digital image processing device for compressing and transmitting digital image data objects defined by a plurality of image pixels, the device comprising: a hardware processor; a communication interface to a digital communication network; and a digital storage device having stored thereon statements and instructions for execution by said processor to: compress each given digital image data object by independently compressing at least some distinct pixel groups defined therefor amongst its plurality of image pixels into independently compressed pixel groups, in which, for each of said compressed pixel groups, a comparison value indicative of a similarity between given pixel data of a given group pixel and reference pixel data of a corresponding reference pixel is computed to at least partially replace said given pixel data; and transmit said independently compressed pixel groups via said communication interface.

In some embodiments, there is provided a digital image processing device for receiving and decompressing digital image data objects defined by a plurality of image pixels. In some embodiments, such a digital image processing device for is configured to receive independent pixel groups, in some embodiments, only some of the pixel groups have been compressed and in other embodiments, all pixel groups will be compressed. digital image processing device for decompression comprises: a hardware processor, which may have one or more processing resources that can process information in parallel; a communication interface to a digital communication network, which in some cases may receive information in parallel (e.g. multi-port interface); and a digital storage device, such as a spinning disk, flash, RAM, or other memory, having stored thereon statements and instructions for execution by said processor to: receive independently compressed pixel groups defined from amongst distinct pixel groups of the image pixels via said communication interface; independently decompress the independently compressed pixel groups, in which, for each of said compressed pixel groups, compressed pixel data is automatically recovered using a comparison value corresponding to the compressed pixel data of a given group pixel and a reference pixel data from a corresponding reference pixel, wherein said comparison value is indicative of a similarity between said compressed pixel data and said reference pixel data.

While the present disclosure describes various exemplary embodiments, the disclosure is not so limited. To the contrary, the disclosure is intended to cover various modifications and equivalent arrangements included within the general scope of the present disclosure.

What is claimed is:

1. A system for transmitting, over a digital network, a digital image data object defined by a plurality of image pixels, said digital image data object for use by a machine-based visual analysis system, the system comprising:
   a digital image compressor operable to compress the digital image data object by independently compressing distinct pixel groups defined amongst the plurality of image pixels into independently compressed pixel groups to be transmitted over the digital network, in which, for each of said compressed pixel groups, a comparison value indicative of a similarity between given pixel data of a given group pixel and reference pixel data of a corresponding reference pixel is computed to at least partially replace said given pixel data; and
   a digital image decompressor communicatively coupled to said digital image compressor via the digital network and operable to receive each of said independently compressed pixel groups for independent decompression, in which, for each of said compressed pixel groups, replaced pixel data is automatically recovered using said comparison value and said reference pixel data;
   wherein said comparison value is defined by a mathematical comparison of said given pixel data and corresponding reference pixel data, wherein said compressed mathematical comparison results in a mathematically lossless compression
   wherein said machine-based visual analysis system comprises a latency requirement associated with compressing, communicating, decompressing, and post-processing of said digital image data object; and
   wherein said digital image compressor is further operable to determine pixel group size based on said latency requirement.

2. The system of claim 1, wherein said compressor is operable to define each of said independent pixel groups from a respective image pixel line.

3. The system of claim 1, wherein said compressor is operable to independently compress at least two of said independent pixel groups in parallel.

4. The system of claim 3, wherein said compressor is further operable to dynamically assign available compression hardware processing resources to independently compress said at least two independent pixel groups in parallel.

5. The system of claim 1, wherein said decompressor is operable to independently decompress at least two of said compressed pixel groups in parallel.

6. The system of claim 5, wherein said decompressor is further operable to dynamically assign available decompression hardware processing resources to independently decompress said at least two compressed pixel groups in parallel.

7. The system of claim 1, wherein said mathematically lossless compression is a Golomb-Rice compression.

8. The system of claim 1, wherein each of said independent pixel groups is selectively compressed or not compressed depending on at least one of the following: a compression ratio of at least one of said independent pixel groups, a target compression ratio of at least one of said independent pixel groups, available transmission bandwidth, compression latency, decompression latency, and digital image data object processing latency.

9. The system of claim 1, wherein pixel data for each of the image pixels is defined by one or more pixel data components comprising a pixel encoding format component.

10. The system of claim 9, wherein said pixel encoding format component is selected from the group consisting of: grayscale, RGB, RGB888, RGB656, YUV, and Bayer.

11. A computerized method for low-latency distributed image processing of a digital image data object in a machine-based visual analysis system, said digital image data object being defined by a plurality of image pixels, the method comprising:
   receiving the digital image data object as input to a digital image compressor;
   compressing the digital image data object by independently compressing distinct pixel groups defined amongst the plurality of image pixels into independently compressed pixel groups by, for each of said compressed pixel groups:
computing a comparison value indicative of a similarity between given pixel data of a given group pixel and reference pixel data of a corresponding reference pixel;
at least partially replacing said given pixel data with said comparison value;
transmitting each of said compressed pixel groups over a digital network to a digital image decompressor; and
independently decompressing at said decompressor each of said compressed pixel groups by, for each of said compressed pixel groups, recovering replaced pixel data using said comparison value and said reference pixel data;
wherein said comparison value is defined by a mathematical comparison of said given pixel data and said corresponding reference pixel data, wherein said mathematical comparison results in a mathematically lossless compression;
wherein said machine-based visual analysis system comprises a latency requirement associated with compressing, communicating, decompressing, and post-processing of said digital image data object; and
wherein said digital image compressor is further operable to determine pixel group size based on said latency requirement.

12. The method of claim 11, wherein at least two of said distinct pixel groups are compressed in parallel.

13. The method of claim 11, wherein at least two of said compressed pixel groups are decompressed in parallel.

14. The method of claim 11, wherein said compressor is operable to define each of said independent pixel groups from a respective image pixel line.

15. The method of claim 11, wherein said mathematically lossless compression is a Golomb-Rice compression.

16. The method of claim 11, wherein a number of pixels in each of said independent pixel groups is dynamically selected based on digital network conditions.

17. The method of claim 11, wherein each of said independent pixel groups is selectively compressed or not compressed depending on at least one of the following: a compression ratio of at least one of said independent pixel groups, a target compression ratio of at least one of said independent pixel groups, available transmission bandwidth, compression latency, decompression latency, and digital image data object processing latency.

18. The system of claim 1, wherein the corresponding reference pixel is selected from the independent pixel group from which it corresponds.

19. The system of claim 1, wherein all image pixels for a given image data object are associated with one of at least two independent pixel groups.

20. The method of claim 11, wherein the corresponding reference pixel is selected from the independent pixel group from which it corresponds.

21. The method of claim 11, wherein all image pixels for a given image data object are associated with one of at least two independent pixel groups.

* * * * *